United States Patent
Sato et al.

(10) Patent No.: US 12,510,716 B2
(45) Date of Patent: Dec. 30, 2025

(54) OPTICAL FIBER CABLE AND CABLE WITH CONNECTOR

(71) Applicant: SUMITOMO ELECTRIC INDUSTRIES, LTD., Osaka (JP)

(72) Inventors: Fumiaki Sato, Osaka (JP); Yuuki Shimoda, Osaka (JP); Yohei Suzuki, Osaka (JP); Hiroki Ishikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 218 days.

(21) Appl. No.: 18/003,562

(22) PCT Filed: Oct. 25, 2021

(86) PCT No.: PCT/JP2021/039283
§ 371 (c)(1),
(2) Date: Dec. 28, 2022

(87) PCT Pub. No.: WO2022/092019
PCT Pub. Date: May 5, 2022

(65) Prior Publication Data
US 2023/0244050 A1    Aug. 3, 2023

(30) Foreign Application Priority Data
Oct. 26, 2020  (JP) ................. 2020-178870

(51) Int. Cl.
*G02B 6/44*       (2006.01)
(52) U.S. Cl.
CPC .......... *G02B 6/443* (2013.01); *G02B 6/4471* (2013.01)
(58) Field of Classification Search
CPC ..................................................... G02B 6/44
(Continued)

(56) References Cited

U.S. PATENT DOCUMENTS 5,809,195 A * 9/1998 Brown .................. G02B 6/245
                                                    385/114
6,137,934 A * 10/2000 Consonni .............. H04B 10/50
                                                    385/100
(Continued)

FOREIGN PATENT DOCUMENTS

CN      204405908 U      6/2015
JP      2002-303769 A    10/2002
(Continued)

OTHER PUBLICATIONS

International Search Report dated Jan. 11, 2022 issued in Patent Application No. PCT/JP2021/039283.
(Continued)

*Primary Examiner* — Kaveh C Kianni
(74) *Attorney, Agent, or Firm* — MCDONALD HOPKINS LLC

(57) ABSTRACT

An optical fiber cable includes optical fiber ribbons and a sheath covering a periphery of the plurality of optical fiber ribbons. Each of the optical fiber ribbon includes optical fibers, and a connected portion and a non-connected portion are intermittently provided in the longitudinal direction. Each optical fiber includes a glass fiber and a coating portion. A ratio of an inner diameter to an outer diameter of the sheath is 0.75 or more. A ratio of a total area of glasses in an optical fiber ribbon accommodating portion to an area of the optical fiber ribbon accommodating portion is 15% or more and 25% or less, the number of the optical fibers in the optical fiber cable is 3000 or more, and the outer diameter of the sheath is 50 mm or less.

7 Claims, 6 Drawing Sheets

(58) Field of Classification Search
USPC .......................................................... 385/114
See application file for complete search history.

(56) References Cited

U.S. PATENT DOCUMENTS

| | | | | |
|---|---|---|---|---|
| 2003/0223713 | A1* | 12/2003 | Chiasson | G02B 6/4404 385/114 |
| 2003/0223714 | A1* | 12/2003 | Conrad | G02B 6/4404 385/114 |
| 2004/0114859 | A1* | 6/2004 | Colgan | G02B 6/3692 385/31 |
| 2004/0146255 | A1* | 7/2004 | Ishikawa | G02B 6/4403 385/114 |
| 2004/0170364 | A1* | 9/2004 | Chiasson | G02B 6/4404 385/106 |
| 2008/0080822 | A1* | 4/2008 | Chiasson | G02B 6/4404 385/114 |
| 2011/0069932 | A1* | 3/2011 | Overton | G02B 6/4433 385/100 |
| 2011/0110635 | A1* | 5/2011 | Toge | G02B 6/441 385/102 |
| 2012/0301092 | A1 | 11/2012 | Le Dissez et al. | |
| 2014/0016905 | A1* | 1/2014 | Tanabe | G02B 6/4405 385/114 |
| 2014/0314382 | A1* | 10/2014 | Sato | G02B 6/4434 385/103 |
| 2015/0192748 | A1* | 7/2015 | Sato | G02B 6/4405 385/114 |
| 2018/0273427 | A1* | 9/2018 | Tanaka | C03C 25/475 |
| 2019/0064462 | A1* | 2/2019 | Okada | G02B 6/4408 |
| 2020/0142144 | A1* | 5/2020 | Blazer | G02B 6/4432 |
| 2020/0292771 | A1* | 9/2020 | Sekine | G02B 6/448 |
| 2020/0310058 | A1* | 10/2020 | Blazer | G02B 6/4411 |
| 2021/0181451 | A1 | 6/2021 | Sato et al. | |
| 2021/0271042 | A1 | 9/2021 | Sato et al. | |
| 2022/0003949 | A1 | 1/2022 | Sato et al. | |
| 2022/0026652 | A1* | 1/2022 | Kuramitsu | G02B 6/443 |
| 2023/0418012 | A1* | 12/2023 | Blazer | G02B 6/4434 |

FOREIGN PATENT DOCUMENTS

| | | |
|---|---|---|
| JP | 2010-008923 A | 1/2010 |
| JP | 2014-016529 A | 1/2014 |
| JP | 2015-102576 A | 6/2015 |
| JP | 2015-517679 A | 6/2015 |
| JP | 2016177138 A * | 10/2016 |
| JP | 2020-076915 A | 5/2020 |
| WO | 2013-165407 A1 | 11/2013 |
| WO | 2019-088256 A1 | 5/2019 |
| WO | 2020-095958 A1 | 5/2020 |

OTHER PUBLICATIONS

Written Opinion dated Jan. 11, 2022 issued in Patent Application No. PCT/JP2021/039283.

* cited by examiner

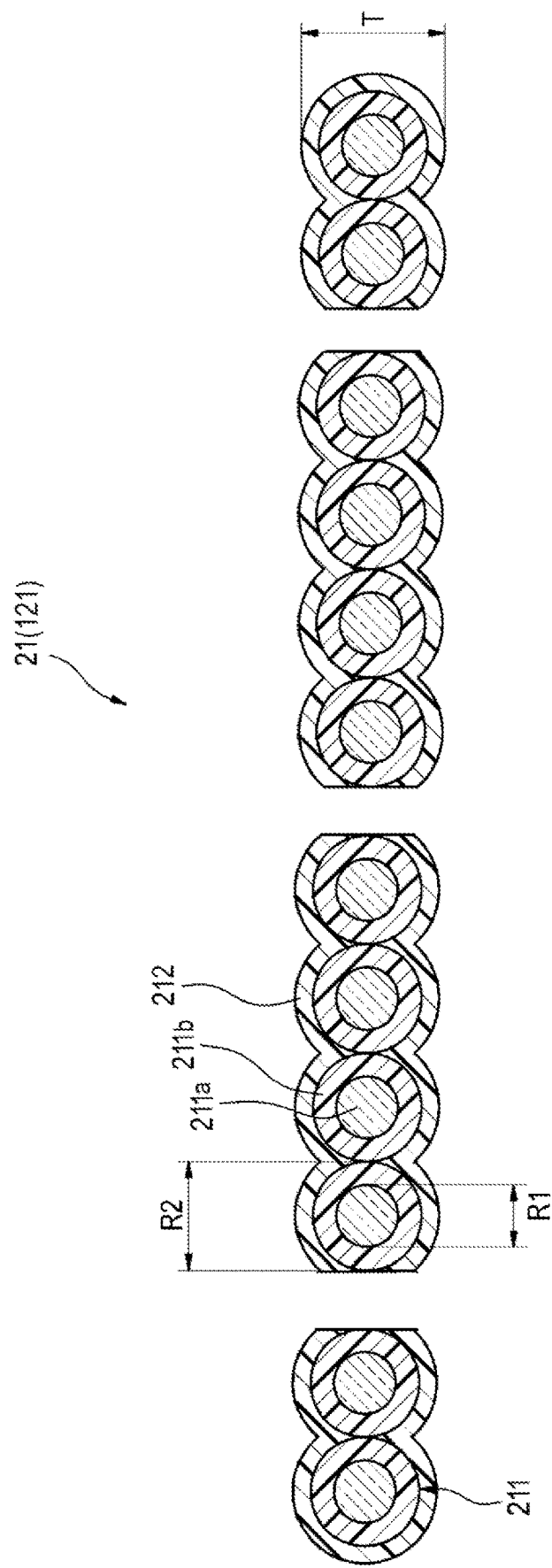

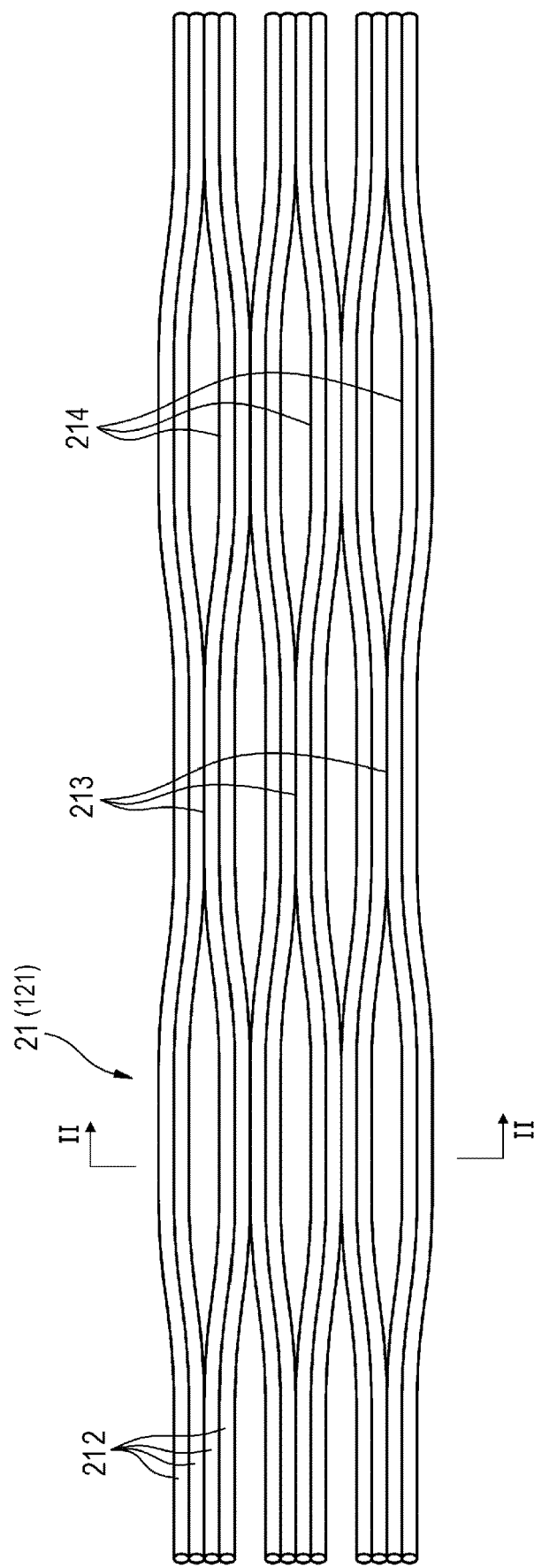

OPTICAL FIBER CABLE AND CABLE WITH CONNECTOR

TECHNICAL FIELD

The present disclosure relates to an optical fiber cable and a cable with connector.

The present application claims priority from Japanese Patent Application No. 2020-178870, filed on Oct. 26, 2020, the entire contents of which is incorporated herein by reference.

BACKGROUND ART

Patent Literature 1 discloses an optical fiber cable including an optical fiber ribbon in which a plurality of optical fibers are intermittently connected, and a pipe that accommodates the optical fiber ribbon.

Patent Literature 2 discloses an optical fiber cable including an optical fiber cable core formed by twisting a plurality of ribbon units each including an optical fiber ribbon in which a plurality of optical fibers are intermittently connected, and a sheath covering an outer periphery of the optical fiber cable core.

Patent Literature 3 discloses an optical fiber cable including a cable core portion formed by twisting a plurality of units each including a plurality of optical fiber ribbons in which a plurality of optical fibers are intermittently connected, and a sheath covering an outer periphery of the cable core portion.

CITATION LIST

Patent Literature

Patent Literature 1: JP2015-517679A
Patent Literature 2: JP2014-016529A
Patent Literature 3: JP2010-008923A

SUMMARY OF INVENTION

Solution to Problem

An optical fiber cable according to the present disclosure includes:
 a plurality of optical fiber ribbons; and
 a sheath covering a periphery of the plurality of optical fiber ribbons,
 each of the optical fiber ribbons includes a plurality of optical fibers, and in a state where the plurality of optical fibers are arranged in parallel in a direction orthogonal to a longitudinal direction of the optical fibers, a connected portion in a state where adjacent optical fibers among a part or all of the optical fibers are connected to each other and a non-connected portion in a state where adjacent optical fibers are not connected to each other are intermittently provided in the longitudinal direction of the optical fibers,
 each of the optical fibers include a glass fiber and a coating portion covering a periphery of the glass fiber,
 a ratio of an inner diameter to an outer diameter of the sheath is 0.75 or more,
 in a cross section orthogonal to a longitudinal direction of the optical fiber cable, a ratio of a total area of glasses accommodated in an optical fiber ribbon accommodating portion in an inner side of the sheath to an area of the optical fiber ribbon accommodating portion is 15% or more and 25% or less, and
 the number of the optical fibers mounted inside the optical fiber cable is 3000 or more, and the outer diameter of the sheath is 50 mm or less.

A cable with connector of the present disclosure includes:
 the above optical fiber cable; and
 a multi-core connector provided at one end of at least one of the optical fiber ribbons of the optical fiber cable.

BRIEF DESCRIPTION OF DRAWINGS

FIG. 2 is a view showing a cross section orthogonal to a longitudinal direction of an optical fiber ribbon.

FIG. 3 is a partially developed view showing the optical fiber ribbon shown in FIG. 2 in the longitudinal direction.

DESCRIPTION OF EMBODIMENTS

Technical Problem

Figure 1A:
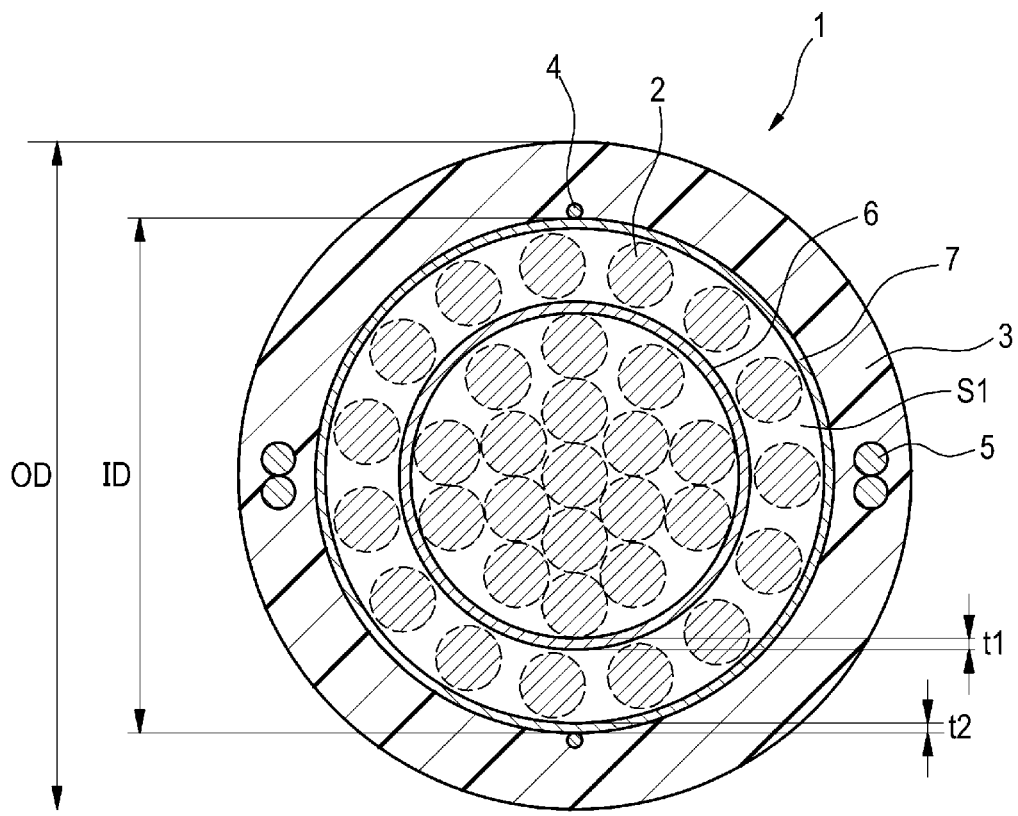
FIG. 1A is a view showing a cross section orthogonal to a longitudinal direction of an optical fiber cable according to a first embodiment.

The present disclosure is to provide an optical fiber cable and a cable with connector in which optical fibers is mountable at a high density and which have lateral pressure resistance.

Advantageous Effects of Invention

According to the present disclosure, an optical fiber cable and a cable with connector in which optical fibers is mountable at a high density and which have lateral pressure resistance is provided.

Description of Embodiments of Present Disclosure

First, embodiments of the present disclosure will be listed and described.

(1) An optical fiber cable of the present disclosure includes:
 a plurality of optical fiber ribbons; and
 a sheath covering a periphery of the plurality of optical fiber ribbons,
 each of the optical fiber ribbon includes a plurality of optical fibers, and in a state where the plurality of optical fibers are arranged in parallel in a direction orthogonal to a longitudinal direction of the optical fibers, a connected portion in a state where adjacent optical fibers among a part or all of the optical fibers are connected to each other and a non-connected portion in a state where adjacent optical fibers are not connected to each other are intermittently provided in the longitudinal direction of the optical fibers, the optical fiber includes a glass fiber and a coating portion covering a periphery of the glass fiber, a ratio of an inner diameter to an outer diameter of the sheath is 0.75 or more, in a cross section orthogonal to a longitudinal direction of the optical fiber cable, a ratio of a total area of glasses accommodated in an optical fiber ribbon accommodating portion in an inner side of the sheath to an area of the optical fiber ribbon accommodating portion is 15% or more and 25% or less, and the number of the optical fibers mounted inside the optical fiber cable is 3000 or more, and the outer diameter of the sheath is 50 mm or less.

According to such a configuration, since the ratio of the inner diameter to the outer diameter of the sheath is 0.75 or more, more optical fibers may be disposed inside the sheath. In the cross section orthogonal to the longitudinal direction of the optical fiber cable, the ratio of the areas of glass accommodated in the optical fiber ribbon accommodating portion in the inner side of the sheath to the area of the optical fiber ribbon accommodating portion is 15% or more and 25% or less, so that the fiber optic cable may withstand a tension applied thereto. The "optical fiber ribbon accommodating portion" refers to a space inside the sheath of the optical fiber cable and excluding a lid tape, and the "glass accommodated in the optical fiber ribbon accommodating portion" may include, for example, the glass fibers constituting the optical fibers or glass fiber reinforced plastics (GFRP) disposed as a tension member in the optical fiber cable. In a case where the tension member disposed in the optical fiber ribbon accommodating portion is not glass but metal, the tension member is excluded.

Further, since the number of optical fibers is 3000 or more, although a thickness of the sheath is thin, collapse or kink of the optical fiber cable is prevented by the optical fibers mounted at a high density in the optical fiber cable even when a lateral pressure is applied to the optical fiber cable. Further, since the glass fibers of the optical fibers function as a tension member, even in a case where a size of the tension member disposed inside the optical fiber cable is reduced, the glass fibers may withstand a tension applied to the optical fiber cable, and more optical fibers may be disposed. Therefore, an optical fiber cable in which the optical fibers may be mounted at a high density and which has lateral pressure resistance may be provided.

(2) In the cross section, a ratio of a total area of the optical fiber ribbons accommodated in the optical fiber ribbon accommodating portion in the inner side of the sheath to the area of the optical fiber ribbon accommodating portion may be 50% or more and 65% or less.

According to such a configuration, even when a lateral pressure is applied to the optical fiber cable, the optical fiber cable is prevented from collapsing because the optical fibers constituting the optical fiber ribbons are accommodated at a high density.

(3) The optical fiber cable may further include: a first lid covering a periphery of a part of the plurality of optical fiber ribbons; and a second lid covering a periphery of the remaining optical fiber ribbons of the plurality of optical fiber ribbons that are disposed outside the first lid.

According to such a configuration, the optical fiber ribbons inside the first lid and the optical fiber ribbons disposed outside the first lid may be distinguished easily.

(4) A dynamic friction coefficient between the first lid and the optical fiber ribbons disposed outside the first lid may be 0.3 or less, and a dynamic friction coefficient between the second lid and the optical fiber ribbons disposed inside the second lid may be 0.3 or less.

The optical fiber ribbons mounted inside the optical fiber cable are likely to move in the longitudinal direction under a low temperature environment due to temperature contraction. According to such a configuration, even when temperature contraction occurs, the optical fiber ribbons may move easily and an increase in transmission loss in a low temperature environment is prevented.

(5) The optical fiber cable may further include: a plurality of assemblies in each of which at least a part of the plurality of optical fiber ribbons are bundled.

According to such a configuration, distinguishing and handling of the optical fiber ribbons in the optical fiber cable may be facilitated.

(6) The optical fiber cable may further include: a plurality of tubes each having a thickness of 0.01 mm or more and 0.2 mm or less, and the tube may be formed so as to cover a periphery of the assembly.

According to such a configuration, for example, the optical fiber units in the optical fiber cable may be distinguished easily by making colors of the respective tubes different from one another. Further, in a case where the optical fiber ribbons of the optical fiber cable are housed in an optical connection box, a closure, or the like, it is not necessary to cover a protective tube in order to protect the optical fiber ribbons exposed after removing the sheath, and thus workability is improved. Further, since a thickness of the tube is thin, a decrease in space, in which the optical fiber ribbons may be mounted, caused by the arrangement of the tubes is prevented.

(7) The optical fiber cable may further include: at least one tension member, and the plurality of optical fiber ribbons may be wound around the tension member in a multilayer structure with the tension member as a center.

According to such a configuration, since the tension member is disposed substantially at a center of the plurality of optical fiber ribbons, the optical fiber cable is unlikely to be easily bent only in a specific direction, but is omnidirectionally bendable with the same force.

(8) A cable with connector of the present disclosure includes:

the above optical fiber cable; and a multi-core connector provided at one end of at least one of the optical fiber ribbons of the optical fiber cable.

According to such a configuration, an operation of connecting the optical fiber cable to another communication member is facilitated.

Details of Embodiments of Present Disclosure

Specific examples of an optical fiber cable and a cable with connector according to the present disclosure will be described with reference to the drawings. The present disclosure is not limited to these examples, is indicated by the claims, and is intended to include all modifications within the scope and meaning equivalent to the claims.

First Embodiment

Figure 1B:
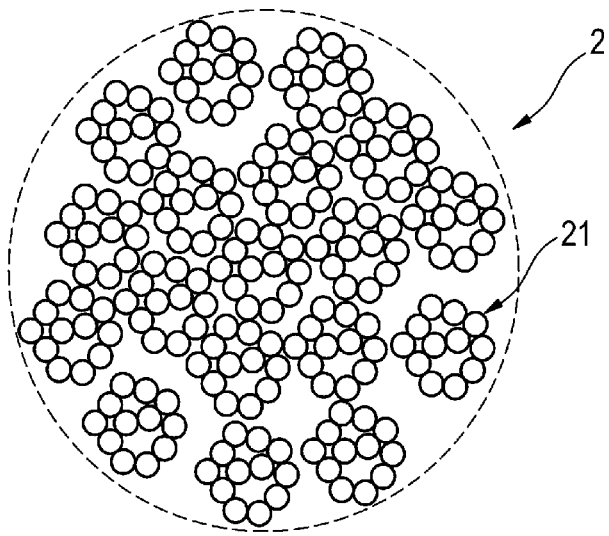
FIG. 1B is a cross-sectional view showing an optical fiber unit of FIG. 1A.

A configuration of an optical fiber cable 1 according to a first embodiment will be described with reference to FIGS. 1A to 3. In FIG. 1A, optical fiber units 2 are hatched and an internal configuration of the optical fiber unit 2 is omitted, and the omitted internal structure of the optical fiber unit 2 is shown in FIG. 1B. In FIGS. 1A and 1B, a circular frame indicated by a broken line indicates a region of the optical fiber unit 2 for convenience, and the frame does not actually exist.

As shown in FIG. 1A, the optical fiber cable 1 includes a plurality of optical fiber units 2 and a sheath 3. In the present example, 32 optical fiber units 2 are mounted inside the sheath 3.

As shown in FIG. 1B, the optical fiber unit 2 includes a plurality of optical fiber ribbons 21. In the present example, the optical fiber unit 2 is formed of an assembly in which 18 optical fiber ribbons 21 are bundled. The 18 optical fiber ribbons 21 forming the assembly may be twisted together.

As shown in FIGS. 2 and 3, the optical fiber ribbon 21 includes a plurality of optical fibers 211 and a ribbon resin 212. In FIGS. 2 and 3, the optical fiber ribbon 21 is shown in a state in which non-connected portions 214 are expanded in a direction in which the optical fibers 211 are arranged.

A plurality of optical fibers 211 are arranged in parallel in a direction orthogonal to a longitudinal direction thereof. The ribbon resin 212 is formed so as to integrate the plurality of optical fibers 211. In the present example, 12 optical fibers 211 are arranged in parallel in a state of being in contact with each other, and the ribbon resin 212 is formed so as to cover an outer periphery of the plurality of optical fibers 211 arranged in parallel. The ribbon resin 212 may be applied to only one surface of the plurality of optical fibers 211 arranged in parallel. The ribbon resin 212 is made of an ultraviolet curable resin or a thermosetting resin.

The optical fiber 211 includes, for example, a glass fiber 211$a$ including a core and a cladding, and a coating portion 211$b$ covering a periphery of the glass fiber 211$a$. The coating portion 211$b$ is formed of single layer coating or multilayer coating made of a resin such as an ultraviolet curable resin. As the optical fiber 211, for example, an optical fiber having a diameter R1 of the glass fiber 211$a$ is 125 μm and a diameter R2 of the optical fiber 211 is 200 μm is used.

As shown in FIG. 3, in at least a part of adjacent optical fibers 211 of the optical fiber ribbon 21, a connected portion 213 in a state where the adjacent optical fibers 211 are connected to each other and the non-connected portion 214 in a state where the adjacent optical fibers 211 are not connected to each other are intermittently provided in the longitudinal direction of the optical fibers 211. In the present example, two of the optical fibers 211 are defined as one group and the connected portion 213 and the non-connected portion 214 of the adjacent groups are intermittently provided in the longitudinal direction of the optical fibers 211. The non-connected portion 214 is formed by, for example, cleaving a part of the ribbon resin 212 with a rotary blade or the like.

The ribbon resin 212 may be formed by applying the resin between the plurality of optical fibers 211 arranged in parallel instead of to the outer periphery of the optical fibers 211. By applying the ribbon resin 212 between predetermined optical fibers 211, the connected portion 213 and the non-connected portion 214 are intermittently provided, and the optical fibers 211 are integrated in a parallel state.

The sheath 3 of FIG. 1A is formed so as to cover a periphery of the plurality of optical fiber units 2. The sheath 3 is made of, for example, a resin having a Young's modulus of 1500 MPa or more at room temperature (for example, 23° C.). A tearing string 4 or a plurality of tension members 5 may be embedded in the sheath 3. The tension member 5 may be made of, for example, a fiber-reinforced plastic (FRP) such as an aramid FRP, a glass FRP, or a carbon FRP, or may be made of a metal wire.

As shown in FIG. 1A, the optical fiber cable 1 may further include a lid that covers a periphery of the optical fiber units 2. In the present example, the optical fiber cable 1 includes a first lid 6 and a second lid 7. The first lid 6 and the second lid 7 are both formed of, for example, a non-woven fabric made of polyester or the like. The first lid 6 is longitudinally or spirally wrapped around a plurality of optical fiber units 2 arranged at a center of the cable, for example. The second lid 7 is longitudinally or spirally wrapped around a plurality of optical fiber units 2 arranged around the first lid 6. The "longitudinally . . . wrapped" means a state in which the lid is wrapped around the optical fiber units 2 such that a longitudinal direction of the lid is parallel to the longitudinal direction of the optical fiber cable 1 and a width direction of the lid is along a peripheral direction of the optical fiber cable 1.

In the optical fiber cable 1 configured as described above, the sheath 3 is formed such that a ratio (ID/OD) of an inner diameter ID to an outer diameter OD is 0.75 or more. For example, in a case where the optical fiber cable 1 of FIG. 1A was manufactured such that the outer diameter OD of the sheath 3 is 29.6 mm and the inner diameter ID of the sheath 3 is 24.8 mm, the ratio of the inner diameter ID to the outer diameter OD is about 0.84.

Further, 3000 or more optical fibers 211 are mounted inside the optical fiber cable 1. For example, 6912 optical fibers 211 are mounted in the optical fiber cable 1 of FIG. 1A.

The optical fiber cable 1 is configured such that a ratio of cross-sectional areas of glass accommodated in an optical fiber ribbon accommodating portion S1 on an inner side of the sheath 3 to a cross-sectional area of the optical fiber ribbon accommodating portion S1 is 15% or more and 25% or less. The cross-sectional area is an area in a cross section orthogonal to the longitudinal direction of the optical fiber cable 1. In the present example, the glass accommodated in the optical fiber ribbon accommodating portion S1 of FIG. 1A is the glass fibers 211$a$ of the optical fibers 211, and the optical fiber ribbon accommodating portion S1 is a space inside the sheath 3 excluding the first lid 6 and the second lid 7.

In a case where the optical fiber cable 1 of FIG. 1A was manufactured such that the inner diameter ID of the sheath 3 is 24.8 mm, a thickness t1 of the first lid 6 is 0.3 mm, a thickness t2 of the second lid 7 is 0.35 mm, and the diameter R1 of the glass fiber 211$a$ of the optical fiber 211 is 0.125 mm, assuming that a substantive inner diameter is calculated as 23.5 mm by subtracting the thickness t1 of the first lid 6 and the thickness t2 of the second lid 7 from the inner diameter ID of the sheath 3, the cross-sectional area of the optical fiber ribbon accommodating portion S1 is $\pi \times (23.5/2)^2 = 434$ mm$^2$. The total cross-sectional area of the glasses accommodated in the optical fiber ribbon accommodating portion S1 are $\pi \times (0.125/2)^2 \times 6912 = 84.8$ mm$^2$. Therefore, the ratio of the cross-sectional areas of the glass accommodated in the optical fiber ribbon accommodating portion S1 to the cross-sectional area of the optical fiber ribbon accommodating portion S1 is about 20%.

As described above, in the optical fiber cable 1 according to the present embodiment, since the ratio of the inner diameter ID to the outer diameter OD of the sheath 3 is 0.75 or more, a large number of optical fibers 211 may be disposed inside the sheath 3. The larger the ratio of the inner diameter ID to the outer diameter OD of the sheath 3, the more easily the optical fiber cable 1 is deformed when a lateral pressure is applied to the optical fiber cable 1. However, since the number of the optical fibers 211 mounted in the optical fiber cable 1 is 3000 or more and the optical fibers are disposed in the optical fiber cable with high density, collapse or kink of the optical fiber cable 1 is prevented. Further, since the ratio of the cross-sectional areas of the glass accommodated in the optical fiber ribbon accommodating portion S1 to the cross-sectional area of the optical fiber ribbon accommodating portion S1 is 15% or more and 25% or less, the optical fiber cable withstands a tension applied thereto. Therefore, an optical fiber cable in which the optical fibers is mountable at a high density and which has lateral pressure resistance is provided.

Further, in the present embodiment, the optical fiber cable 1 includes a plurality of optical fiber units 2 each formed of an assembly in which a plurality of optical fiber ribbons 21 are bundled. Thus, distinguishing and handling of the optical fiber ribbons 21 in the optical fiber cable 1 are easy.

In the present embodiment, the optical fiber cable 1 includes the first lid 6 and the second lid 7. With this configuration, even in the case of a multi-core cable having 3000 or more cores, it is easy to distinguish the optical fiber units 2 inside the first lid 6 from the optical fiber units 2 disposed outside the first lid 6.

The first lid 6 may be made of a material such that a surface thereof facing the second lid 7 has low friction. For example, the first lid 6 is formed such that a dynamic friction coefficient between the first lid 6 and the optical fiber ribbons 21 constituting the optical fiber units 2 disposed outside the first lid 6 is 0.3 or less. The second lid 7 may be made of a material such that a surface thereof facing the first lid 6 has low friction. For example, the second lid 7 is formed such that a dynamic friction coefficient between the second lid 7 and the optical fiber ribbons 21 constituting the optical fiber units 2 disposed inside the second lid 7 is 0.3 or less. The optical fiber units 2 mounted inside the optical fiber cable 1 are likely to move in the longitudinal direction under a low temperature environment due to temperature contraction. Therefore, an increase in transmission loss in a low-temperature environment is prevented.

The dynamic friction coefficient may be measured, for example, between sheet-shaped lid and the optical fiber ribbon according to the ISO standard 8295.

In the present embodiment, the optical fiber cable 1 may be configured such that a ratio of cross-sectional areas of the optical fiber ribbons 21 accommodated in the optical fiber ribbon accommodating portion S1 to the cross-sectional area of the optical fiber ribbon accommodating portion S1 in the inner side of the sheath 3 is 50% or more and 65% or less.

In the optical fiber cable 1 of FIG. 1A, in a case where the optical fiber ribbon 21 was manufactured such that the diameter R2 of the optical fiber 211 is 200 μm and a diameter T of the optical fiber 211 including the ribbon resin 212 of the optical fiber ribbon 21 is 225 μm, the cross-sectional areas of the optical fiber ribbons 21 are $\pi \times (0.225/2)^2 \times 6912 = 275$ mm². Therefore, the ratio of the cross-sectional areas of the optical fiber ribbons 21 accommodated in the optical fiber ribbon accommodating portion S1 to the cross-sectional area of the optical fiber ribbon accommodating portion S1 is about 63%.

According to such a configuration, since the ratio of the cross-sectional areas of the optical fiber ribbons 21 accommodated in the optical fiber ribbon accommodating portion S1 to the cross-sectional area of the optical fiber ribbon accommodating portion S1 is 50% or more, even when a lateral pressure is applied to the optical fiber cable 1, the optical fiber cable 1 is prevented from collapsing because the optical fibers 211 constituting the optical fiber ribbons 21 are accommodated at a high density. In a case where the ratio of the cross-sectional areas of the optical fiber ribbons 21 accommodated in the optical fiber ribbon accommodating portion S1 to the cross-sectional area of the optical fiber ribbon accommodating portion S1 increases, the transmission loss increases. However, since the ratio of the cross-sectional areas of the optical fiber ribbons 21 accommodated in the optical fiber ribbon accommodating portion S1 to the cross-sectional area of the optical fiber ribbon accommodating portion S1 is 65% or less, an increase in transmission loss is prevented.

Figure 4:
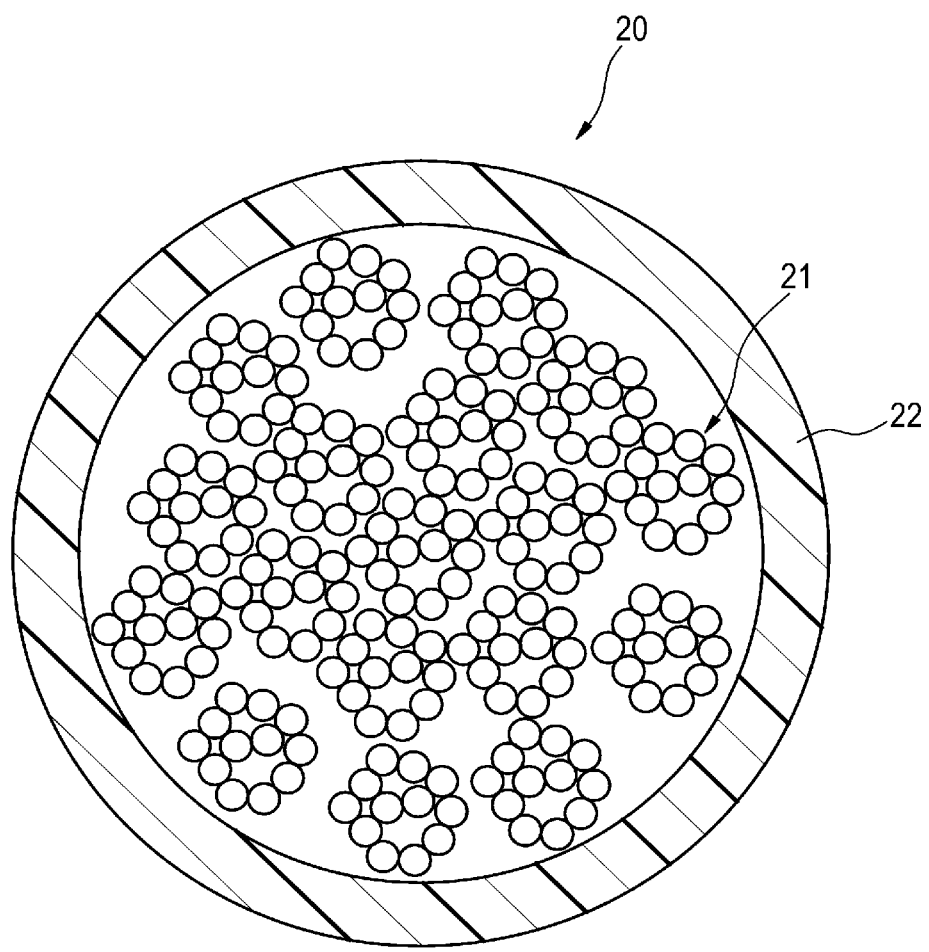
FIG. 4 is a cross-sectional view showing a modification of the optical fiber unit.

In the present embodiment, as shown in FIG. 4, the optical fiber unit 2 may include a tube 22 that covers a periphery of the assembly of the optical fiber ribbons 21. The tube 22 has a thickness of, for example, 0.01 mm or more and 0.2 mm or less. According to such a configuration, for example, the optical fiber units 2 in the optical fiber cable 1 may be distinguished easily by making colors of the respective tubes 22 different from one another. Further, in a case where the optical fiber units 2 of the optical fiber cable 1 are housed in an optical connection box, a closure, or the like, it is not necessary to cover a protective tube in order to protect the optical fiber ribbons 21 exposed after removing the sheath 3, and thus workability is improved. Further, since a thickness of the tube 22 is thin, a decrease in space, in which the optical fiber ribbons 21 may be mounted, caused by the arrangement of the tubes 22 may be prevented. Although all the optical fiber units 2 are covered with the tubes 22 in the present example, only a part of the optical fiber units 2 may be covered with the tubes 22, for example. By reducing the number of tubes 22, more optical fibers 211 may be mounted in the optical fiber cable 1.

Second Embodiment

Figure 5A:
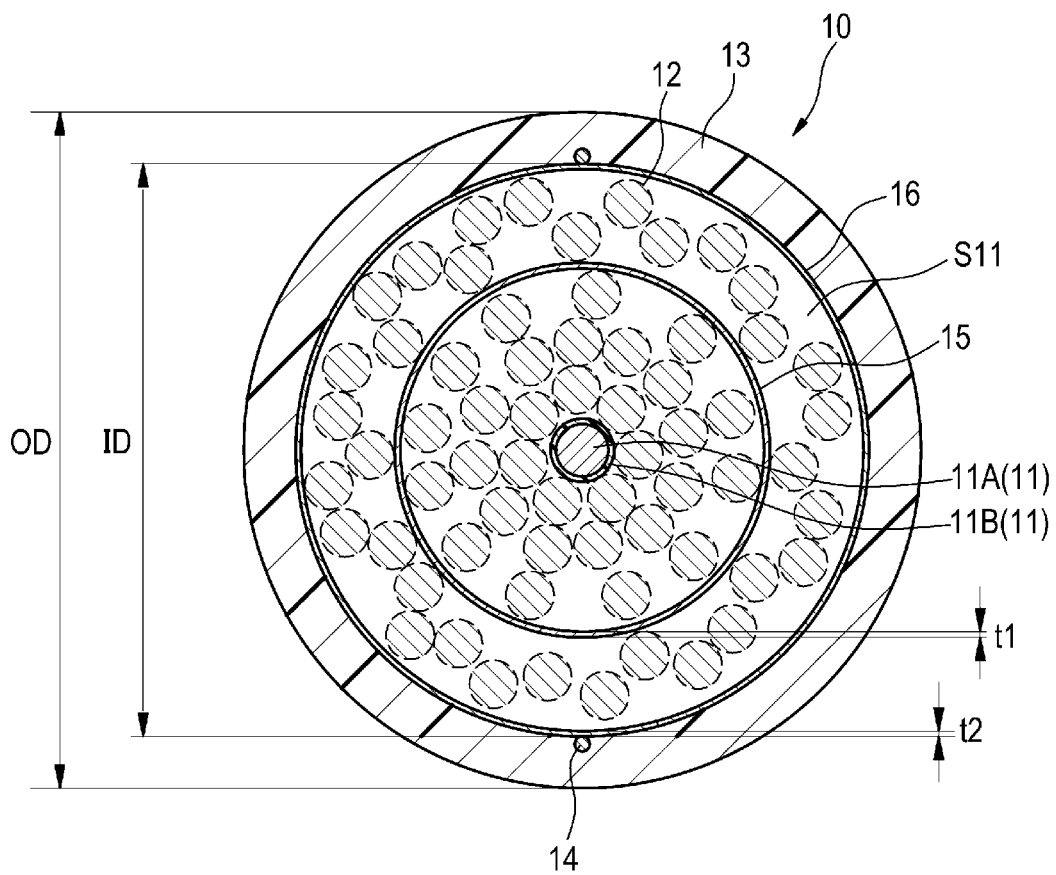
FIG. 5A is a view showing a cross section orthogonal to a longitudinal direction of an optical fiber cable according to a second embodiment.
Figure 5B:
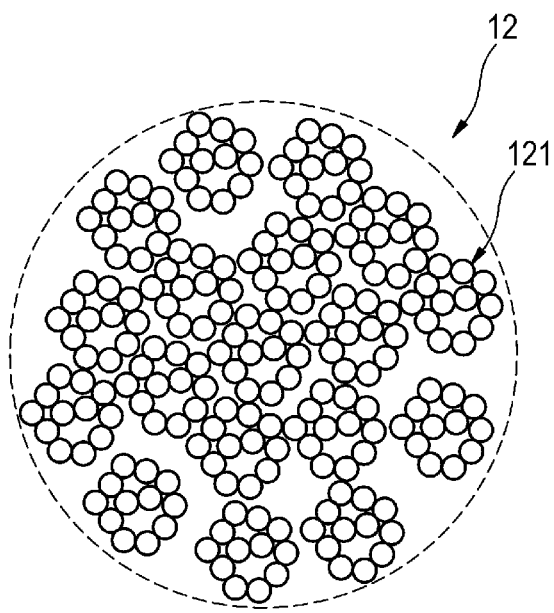
FIG. 5B is a cross-sectional view showing an optical fiber unit of FIG. 5A.

A configuration of an optical fiber cable 10 according to a second embodiment will be described with reference to FIGS. 5A and 5B. In FIG. 5A, optical fiber units 12 are hatched and an internal configuration of the optical fiber unit 12 is omitted, and the omitted internal structure of the optical fiber unit 12 is shown in FIG. 5B. In FIGS. 5A and 5B, a circular frame indicated by a broken line indicates a region of the optical fiber unit 12 for convenience, and the frame does not actually exist.

As shown in FIG. 5A, the optical fiber cable 10 includes a tension member 11, a plurality of optical fiber units 12, and a sheath 13. In the present example, 64 optical fiber units 12 are mounted inside the sheath 13.

The tension member 11 is disposed at a central position of the optical fiber cable 10 along a central axis direction of the optical fiber cable 10. The tension member 11 includes, for example, glass fiber reinforced plastics (GFRP) 11A and a coating portion 11B that covers a periphery of the GFRP 11A. In the present example, one tension member 11 is disposed in the optical fiber cable 10, but a plurality of tension members 11 may be collectively disposed.

The plurality of optical fiber units 12 are wound around the tension member 11 in a multilayer structure with the tension member 11 as a center. As shown in FIG. 5B, the optical fiber unit 12 includes a plurality of optical fiber ribbons 121. In the present example, the optical fiber unit 12 is formed of an assembly in which 18 optical fiber ribbons 121 are bundled. The 18 optical fiber ribbons 121 forming the assembly may be twisted together.

As shown in FIGS. 2 and 3, in each of the plurality of optical fiber ribbons 121, the connected portion 213 in a state where the adjacent optical fibers 211 among a part or all of the optical fibers 211 are connected to each other and the non-connected portion 214 in a state where the adjacent optical fibers 211 are not connected to each other are intermittently provided in the longitudinal direction of the optical fibers 211. Since a configuration of the optical fiber ribbon 121 is the same as the configuration of the optical fiber ribbon 21 of the first embodiment, a detailed description thereof will be omitted.

The sheath 13 is formed so as to cover a periphery of the plurality of optical fiber units 12. The sheath 13 is made of, for example, a resin having a Young's modulus of 1500 MPa or more at room temperature (for example, 23° C.). A tearing string 14 may be embedded in the sheath 13.

The optical fiber cable 10 may further include a lid that covers the periphery of the optical fiber units 12. In the present example, the optical fiber cable 10 includes a first lid 15 and a second lid 16. The first lid 15 and the second lid 16 are both formed of, for example, a non-woven fabric made of polyester or the like. The first lid 15 is longitudinally or spirally wrapped around the plurality of optical fiber units 12 arranged at a center of the cable. The second lid 16 is longitudinally or spirally wrapped around the plurality of optical fiber units 12 arranged around the first lid 15.

In the optical fiber cable 10 configured as described above, the sheath 13 is formed such that a ratio (ID/OD) of an inner diameter ID to an outer diameter OD is 0.75 or more. For example, in a case where the optical fiber cable 10 of FIG. 5A was manufactured such that the outer diameter OD of the sheath 13 is 40.4 mm and the inner diameter ID of the sheath 13 is 34.8 mm, the ratio of the inner diameter ID to the outer diameter OD is about 0.86.

Further, 3000 or more optical fibers 211 are mounted inside the optical fiber cable 10. For example, 13824 optical fibers 211 are mounted inside the optical fiber cable 10 of FIG. 5A.

The optical fiber cable 10 is configured such that a ratio of cross-sectional areas of glass accommodated in an optical fiber ribbon accommodating portion S11 to a cross-sectional area of the optical fiber ribbon accommodating portion S11 is 15% or more and 25% or less. In the present example, the glass mounted inside the optical fiber cable 10 of FIG. 5A includes the GFRP 11A constituting the tension member 11 in addition to the glass fibers 211a of the optical fibers 211. In a case where the optical fiber cable 10 of FIG. 5A was manufactured such that the inner diameter ID of the sheath 13 is 34.8 mm, a thickness of the first lid 15 is 0.3 mm, a thickness of the second lid 16 is 0.35 mm, the diameter R1 of the glass fiber 211a of the optical fiber 211 is 0.125 mm and a diameter of the GFRP 11A is 4 mm, assuming that a substantive inner diameter is calculated as 33.5 mm by subtracting the thickness of the first lid 15 and the thickness of the second lid 16 from the inner diameter ID of the sheath 3, the cross-sectional area of the optical fiber ribbon accommodating portion S11 is $\pi \times (33.5/2)^2 - 881$ mm$^2$. The total cross-sectional area of the glasses accommodated in the optical fiber ribbon accommodating portion S11 are $\pi \times (0.125/2)^2 \times 13824 + \pi \times (4/2)^2 = 182$ mm$^2$. Therefore, the ratio of the cross-sectional areas of the glass accommodated in the optical fiber ribbon accommodating portion S11 to the cross-sectional area of the optical fiber ribbon accommodating portion S11 is about 21%.

The optical fiber cable 10 may be configured such that a ratio of cross-sectional areas of the optical fiber ribbons 121 accommodated in the optical fiber ribbon accommodating portion S11 to the cross-sectional area of the optical fiber ribbon accommodating portion S11 is 50% or more and 65% or less. In the optical fiber cable 10 of FIG. 5A, in a case where the optical fiber ribbon 121 was manufactured such that the diameter R2 of the optical fiber 211 is 200 μm and the diameter T of the optical fiber 211 including the ribbon resin 212 of the optical fiber ribbon 121 is 225 μm, the cross-sectional areas of the optical fiber ribbons 121 are $\pi \times (0.225/2)^2 \times 13824 = 549.6550$ mm$^2$. Therefore, the ratio of the cross-sectional areas of the optical fiber ribbons 121 accommodated in the optical fiber ribbon accommodating portion S11 to the cross-sectional area of the optical fiber ribbon accommodating portion S11 is about 62%.

As described above, the optical fiber cable 10 according to the present embodiment may have the same effects as those of the optical fiber cable 1 according to the first embodiment. Further, since the glass fibers 211a of the optical fibers 211 function as a tension member, even in a case where a size of the tension member 11 disposed inside the optical fiber cable 10 is reduced, the glass fibers 211a withstands a tension applied to the optical fiber cable. As a result, a large number of optical fibers 211 may be mounted.

In the present embodiment, the plurality of optical fiber units 12 are wound around the tension member 11 in a multilayer structure with the tension member 11 as a center. Accordingly, since the tension member 11 is disposed at a center of the plurality of optical fiber units 12, the optical fiber cable 10 is unlikely to be easily bent only in a specific direction, but is omnidirectionally bendable with the same force.

In the present embodiment, as shown in FIG. 4, the optical fiber unit 12 may include a tube 22 that covers a periphery of the assembly of the optical fiber ribbons 121.

Although the present disclosure has been described in detail with reference to a specific embodiment, it will be apparent to those skilled in the art that various changes and modifications may be made without departing from the spirit and scope of the present disclosure. The numbers, positions, shapes or the like of components described above are not limited to the above embodiment, and may be changed to suitable numbers, positions, shapes or the like during carrying out the present disclosure.

Figure 6:
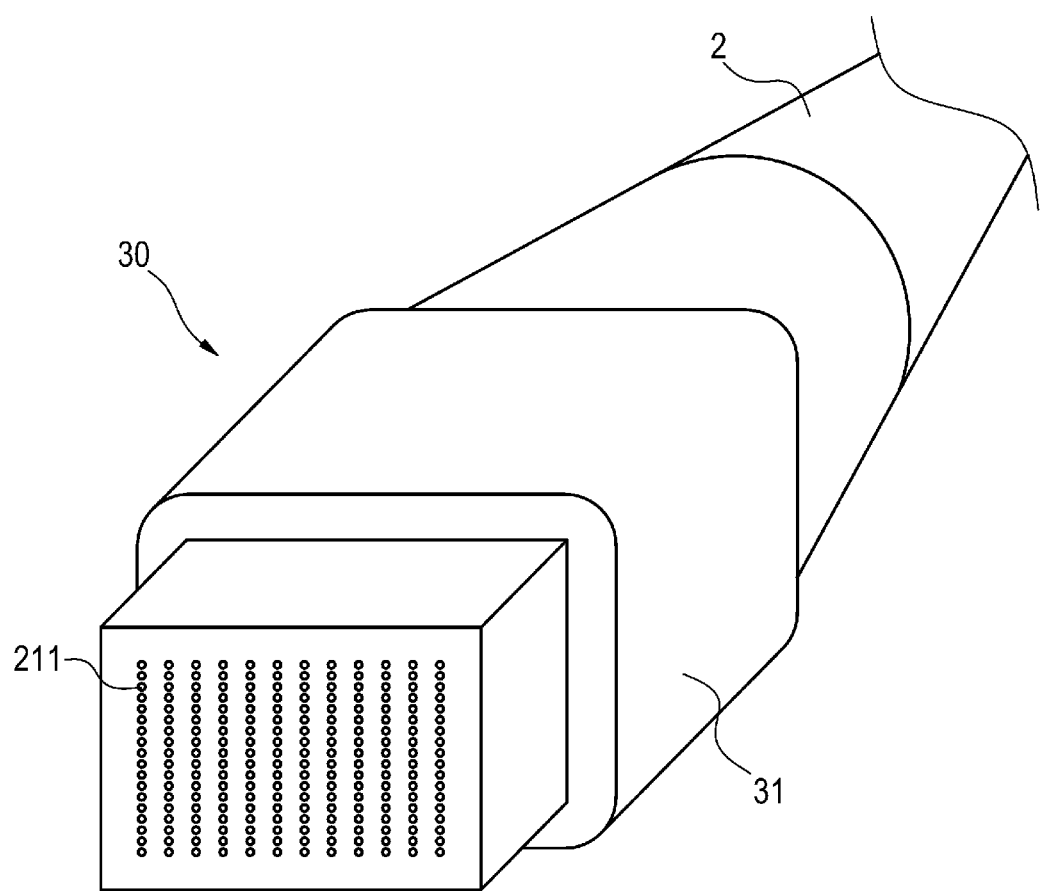
FIG. 6 is a perspective view schematically illustrating a state in which the optical fiber unit shown in FIGS. 1B and 4 is end-formed.

As shown in FIG. 6, the optical fiber cable 1 of the first embodiment may be formed as a cable with connector 30. That is, the cable with connector 30 includes the optical fiber cable 1 and a multi-core connector 31 provided at one end of at least one optical fiber unit 2 of the optical fiber cable 1. In FIG. 6, the multi-core connector 31 is connected to the optical fiber unit 2. By connecting the optical fiber unit 2 to the multi-core connector 31 in advance, workability in optically connecting the optical fiber cable 1 may be facilitated. A plurality of multi-core connectors may be respectively connected to the optical fiber units 2. Similarly, as shown in FIG. 6, the optical fiber cable 10 of the second embodiment may be formed as a cable with connector 30.

In the first embodiment described above, the optical fiber unit 2 may include a bundling member wound around the assembly of the plurality of optical fiber ribbons 21, instead of the tube 22. In this case, the optical fiber units 2 in the optical fiber cable 1 may also be distinguished easily by making colors of the bundling members different from one another. Similarly, in the second embodiment, the optical fiber unit 12 may include a bundling member wound around the assembly of the plurality of optical fiber ribbons 121, instead of the tube 22.

In the first embodiment described above, the plurality of optical fiber ribbons 21 forming the assembly are twisted together, but the plurality of optical fiber ribbons 21 may form the assembly without being twisted together. Similarly, in the second embodiment, the plurality of optical fiber ribbons 121 forming the assembly are twisted together, but the plurality of optical fiber ribbons 121 may form the assembly without being twisted together.

In the first embodiment described above, the first lid 6 and the second lid 7 may both have a water absorption property. Similarly, in the second embodiment, the first lid 15 and the second lid 16 may both have a water absorption property. The first lids 6, 15 and the second lids 7, 16 are each formed by, for example, attaching water-absorbent powders to a base cloth made of polyester or the like. Thus, water is prevented from entering inside the first lids 6, 15 and the second lids 7, 16.

In the first embodiment and the second embodiment described above, the optical fiber ribbons 21 or the optical fiber ribbons 121 are arranged in parallel in a state where 12 optical fibers 211 are in contact with each other, but the number of optical fibers 211 and the contact state between the adjacent optical fibers 211 are not limited to the structures shown in FIGS. 2 and 3, and may be changed as appropriate.

In the first embodiment described above, the plurality of optical fiber units 2 may be twisted together along the longitudinal direction of the optical fiber cable 1. Similarly, in the second embodiment, the plurality of optical fiber units 12 may be twisted together along the longitudinal direction of the optical fiber cable 10.

REFERENCE SIGNS LIST

1: optical fiber cable
2: optical fiber unit
3: sheath
4: tearing string
5: tension member
6: first lid
7: second lid
10: optical fiber cable
11: tension member
11A: GFRP
11B: coating portion
12: optical fiber unit
13: sheath
14: tearing string
15: first lid
16: second lid
21: optical fiber ribbon
22: tube
30: cable
31: multi-core connector
121: optical fiber ribbon
211: optical fiber
211*a*: glass fiber
211*b*: coating portion
212: ribbon resin
213: connected portion
214: non-connected portion
ID: inner diameter
OD: outer diameter
R1: diameter of glass fiber
R2: diameter of optical fiber
S1: optical fiber ribbon accommodating portion
S11: optical fiber ribbon accommodating portion
T: diameter of optical fiber including ribbon resin

What is claimed is:

1. An optical fiber cable comprising:
a plurality of optical fiber ribbons; and
a sheath covering a periphery of the plurality of optical fiber ribbons, wherein
each of the optical fiber ribbon includes a plurality of optical fibers, and in a state where the plurality of optical fibers are arranged in parallel in a direction orthogonal to a longitudinal direction of the optical fibers, a connected portion in a state where adjacent optical fibers among a part or all of the optical fibers are connected to each other and a non-connected portion in a state where adjacent optical fibers are not connected to each other are intermittently provided in the longitudinal direction of the optical fibers,
each of the optical fibers includes a glass fiber and a coating portion covering a periphery of the glass fiber,
a ratio of an inner diameter to an outer diameter of the sheath is 0.75 or more,
in a cross section orthogonal to a longitudinal direction of the optical fiber cable, a ratio of a total area of glasses accommodated in an optical fiber ribbon accommodating portion in an inner side of the sheath to an area of the optical fiber ribbon accommodating portion is 15% or more and 25% or less, and
the number of the optical fibers mounted inside the optical fiber cable is 3000 or more, and the outer diameter of the sheath is 50 mm or less, wherein
in the cross section, a ratio of a total area of the optical fiber ribbons accommodated in the optical fiber ribbon accommodating portion in the inner side of the sheath to the area of the optical fiber ribbon accommodating portion is 50% or more and 65% or less.

2. The optical fiber cable according to claim 1, further comprising:
a first lid covering a periphery of a part of the plurality of optical fiber ribbons; and
a second lid covering a periphery of the remaining optical fiber ribbons of the plurality of optical fiber ribbons that are disposed outside the first lid.

3. The optical fiber cable according to claim 2, wherein a dynamic friction coefficient between the first lid and the optical fiber ribbons disposed outside the first lid is 0.3 or less, and a dynamic friction coefficient between the second lid and the optical fiber ribbons disposed inside the second lid is 0.3 or less.

4. The optical fiber cable according to claim 1, further comprising
a plurality of assemblies in each of which at least a part of the plurality of optical fiber ribbons are bundled.

5. The optical fiber cable according to claim 4, further comprising:
a plurality of tubes each having a thickness of 0.01 mm or more and 0.2 mm or less, wherein
the tube is formed so as to cover a periphery of the assembly.

6. The optical fiber cable according to claim 1, further comprising:
at least one tension member, wherein
the plurality of optical fiber ribbons are wound around the tension member in a multilayer structure with the tension member as a center.

7. A cable with connector, comprising:
the optical fiber cable according to claim 1; and
a multi-core connector provided at one end of at least one of the optical fiber ribbons of the optical fiber cable.

* * * * *